(12) United States Patent
Levi Acobas

(10) Patent No.: US 7,189,443 B2
(45) Date of Patent: *Mar. 13, 2007

(54) SELF-LEVELLING UNDER-PACKING FOR PRINTING PRESSES

(75) Inventor: Roberto Levi Acobas, Milan (IT)

(73) Assignee: Printgraph Waterless S.R.L., Milanese MI (IT)

( * ) Notice: Subject to any disclaimer, the term of this patent is extended or adjusted under 35 U.S.C. 154(b) by 9 days.

This patent is subject to a terminal disclaimer.

(21) Appl. No.: 10/828,187

(22) Filed: Apr. 21, 2004

(65) Prior Publication Data

US 2005/0158564 A1   Jul. 21, 2005

Related U.S. Application Data

(63) Continuation-in-part of application No. 10/827,355, filed on Apr. 20, 2004, now abandoned.

(30) Foreign Application Priority Data

Jan. 15, 2004   (IT)   .......................... MI2004A0041

(51) Int. Cl.
*B32B 9/00* (2006.01)

(52) U.S. Cl. .................. 428/40.1; 101/415.1; 101/493; 428/41.3; 428/42.1; 428/192; 428/194; 428/343; 428/354; 428/480

(58) Field of Classification Search .............. 428/40.1, 428/41.3, 42.1, 192, 194, 343, 354, 480; 101/415.1, 493
See application file for complete search history.

(56) References Cited

U.S. PATENT DOCUMENTS

| | | | |
|---|---|---|---|
| 3,301,730 A | | 1/1967 | Spiwak et al. |
| 3,410,718 A | | 11/1968 | Smith |
| 3,705,072 A | | 12/1972 | Rosvold |
| 3,802,952 A | * | 4/1974 | Gurin et al. ................. 428/215 |
| 3,937,861 A | * | 2/1976 | Zuckerman et al. ........ 442/148 |
| 4,515,739 A | | 5/1985 | Maine |
| 6,723,409 B2 | * | 4/2004 | Levi Acobas .............. 428/40.1 |

FOREIGN PATENT DOCUMENTS

| | | |
|---|---|---|
| EP | 0 665 469 | 8/1995 |
| EP | 1 323 527 | 7/2003 |
| WO | WO 01/92026 | 12/2001 |
| WO | WO 01/92027 | 12/2001 |

* cited by examiner

*Primary Examiner*—Nasser Ahmad
(74) *Attorney, Agent, or Firm*—Young & Thompson

(57) ABSTRACT

A self-levelling under-packing for printing presses, in particular offset presses, includes at least one polyester-based layer and at least one polyurethane elastomer layer joined inseparably together. The polyester-based layer may be between 50 μm and 350 μm and the polyurethane elastomer layer may be between 20 μm and 1000 μm. The polyester-based layer may be adhesive-coated on one side, in which case the thickness, including the adhesive, may be between 40 and 100 μm, with the adhesive thickness not exceeding about 5 μm.

16 Claims, 1 Drawing Sheet

SELF-LEVELLING UNDER-PACKING FOR PRINTING PRESSES

CROSS REFERENCE TO RELATED APPLICATIONS

This application is a continuation-in-part of the U.S. application Ser. No. 10/827,355, now abandoned filed on Apr. 20, 2004, which corresponds to Italy Patent Application No. MI2004A000041 filed on Jan. 15, 2004, the entirety of which applications are hereby expressly incorporated by reference in the accompanying application.

The present invention relates to under-packing for printing presses, particularly offset.

BACKGROUND OF THE INVENTION

With particular but non-exclusive reference to offset printing presses, these basically comprise three cylinders: the plate cylinder, the blanket cylinder covered with rubber-coated fabric, and the impression cylinder. Below the said covering, the blanket cylinder comprises traditional under-packing formed: from individually removable (incompressible) gauged paper sheets for adapting the working diameter of the cylinder, and a separate under-blanket generally consisting of elastically compressible polybutadiene.

For levelling purposes, it is already known in the printing press sector to also use, as under-packing, polyester films coated with adhesive on one side.

The drawback of using paper and polyester is that both are rigid (hence not properly self-levelling), the former also not being fire-retardant.

From another patent of the same applicant (European patent 1,323,527), it is already known to use as under-packing a series of sheets (of paper or polyurethane) joined together by known pressure sensitive adhesive which enables the individual sheets to be removed to adapt the under-packing (of rubber-coated fabric) to the required thickness.

SUMMARY OF THE INVENTION

An object of the present invention is to provide under-packing for printing presses which is able to satisfy a large series of requirements which the current art only partially satisfies; more precisely the under-packing of the invention is able to satisfy the following requirements: ecocompatibility, flame retardance, resistance to solvents and to mechanical stresses, excellent machinability, long life, considerable versatility of use, excellent adaptation to the cylinder and resilient elasticity, better constructional geometry of the point of printing, considerable screen spreading uniformity, better printing stability.

This and further objects which will be more apparent from the ensuing detailed description are attained by an under-packing for printing presses in accordance with the technical teachings herein.

BRIEF DESCRIPTION OF THE DRAWINGS

The invention will be more apparent from the following detailed description, provided by way of non-limiting example, of some preferred embodiments thereof presented in the form of examples on the basis of the following schematic FIGS. from 1 to 3, all showing sections through different versions of under-packing of the invention.

DETAILED DESCRIPTION OF THE PREFERRED EMBODIMENTS

The under-packing of the invention (always indicated by 1) consists in its most general expression of a composite comprising a non-elastic part (defined as rigid for simplicity) indicated by 2 formed from a film based on high-limpidity polyester (PES) (for example transparent antinewton polyester, the term "antinewton" indicating that it has been slightly roughened by physical treatment to facilitate bonding to the other layer) as produced by POLICROM Inc., of Bensalem, Pa. (USA) and by Toray, Japan), and an elastomeric covering 3 (on one side of the PES film) based on polyurethane and/or thermoplastic polyurethane (for example the products known by the name Estane 54660 and 58271 of NOVEON Inc., USA).

Figure 1:
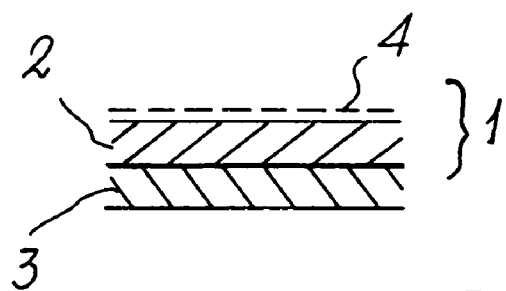
Figure 2:
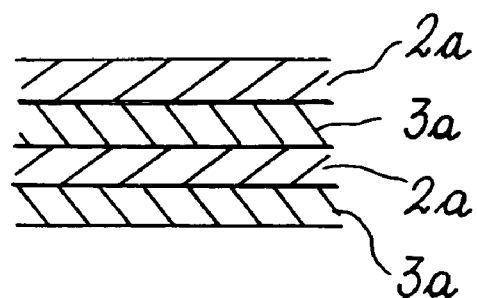
Figure 3:
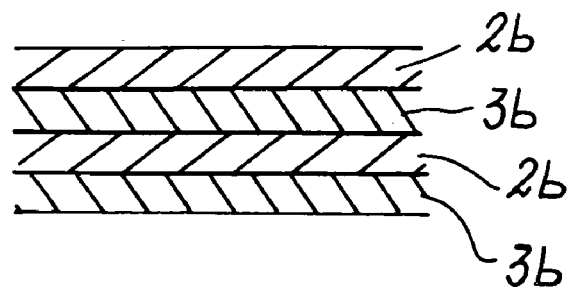

On the opposite side to that with the elastomeric covering, the composite can present one or more strips of adhesive, or be completely adhesive-coated, with products of known type enabling facilitated attachment and detachment (pressure sensitive). For connection to the metal surface of a cylinder or of a "metal blanket", the adhesive, as already stated, will involve the whole surface in question. The adhesive is indicated by 4 in FIG. 1.

The composite can be obtained by known covering methods for producing composite film, for example by blade spreading, by calendering, by coextrusion or a combination of calendering and coextrusion.

The thickness of the applied elastomer can vary from a minimum of 20 μm up to 1000 μm (for each layer, with a maximum of three layers in the case of a composite with more than one layer inseparably joined together).

The thickness of the polyester based film can vary between 40–100 μm (with one side totally adhesive-coated and including not more than 5 μm of adhesive in its thickness) and between 50–350 μm (without adhesive coating) or with partial adhesive coating along an edge strip.

The examples are as follows:

EXAMPLE 1

A polyester based film of 40 μm thickness totally adhesive-coated on one face (protected by a removable silicon-coated film) is covered on its non-adhesive side in known manner (blade spreading) with a 100 μm thickness of elastomer based on high solid polyurethane in DMF (dimethylformamide) solvent.

The adhesive is of the kind known as attach/reattach known as pressure sensitive.

In particular the chemical/physical characteristics of the polyurethane are the following:

| | | |
|---|---|---|
| Shore hardness A | 75–95 | DIN 53505 |
| Density g/cm$^3$ | 1.10–1.25 | DIN 53479 |
| Cyclic compression % | 60% compressible | DIN 53517 |
| Resilience % | 30–40 | DIN 53512 |
| Solvent resistance | resistant | |

The test consisted of carrying out a cycle of one million compressions (of 60% on the compressible side) without undergoing any thickness decrease in 5 cm elastomeric discs subjected to 60% compressive load on the elastomer side with preload of 2N, cycle frequency 20 Hz.

EXAMPLE 2

Using the calendering method, a polyester based film of 40 μm thickness is covered on one side with an elastomer layer (based on high solid polyurethane) of 160 μm thickness. Reference should be made to Example 1 for adhesive-coating details.

EXAMPLE 3

Using the known coextrusion method, a 100 μm polyester based film is combined with a 100 μm film of elastomer based on thermoplastic polyurethane.

EXAMPLE 4

A 625 μm elastomer layer based on thermoplastic polyurethane is applied by calendering to a 175 μm standard polyester based film.

EXAMPLE 5

The composite is formed from a 350 μm polyester based film and a 450 μm blade-spread layer of polyurethane based elastomer.

EXAMPLE 6

The composite is formed from a 500 μm polyester based film and a 1000 μm calendered layer of polyurethane based elastomer.

EXAMPLE 7

A 300 μm layer of polyurethane is applied (by blade-spreading) onto a first layer formed from a 175 μm polyester based film.

A 50 μm polyester based film is then applied (by calendering) to the polyurethane layer, followed (by calendering) by a 255 μm elastomer layer (thermoplastic polyurethane), then finally by a 20 μm layer of thermoplastic polyurethane of different characteristics, for example hardness.

EXAMPLE 8 (FIG. 2)

A first composite—obtained by calendering is formed from a 175 μm film (2a) of polyester, and a 600 μm polyurethane elastomer layer (3a)—is calendered on a second identical composite again formed from a 175 μm film (2a) of polyester, and a 600 μm polyurethane elastomer layer (3a). The result represents a different requirement of the user which is satisfied with a simple combining of two identical composites, i.e. of the same composite.

EXAMPLE 9 (FIG. 3)

A coextruded and calendered multi-layer composite formed from a 350 μm first polyester film (2b), a 600 μm layer of thermoplastic polyurethane elastomer (3b), a 50 μm second polyester film (2b) and a 550 μm second polyurethane elastomer layer (3b).

EXAMPLE 10

At least one 50 μm polyester film coated with pressure sensitive adhesive (i.e. detach/reattach) is applied to a composite comprising a 225 μm polyurethane film and a 175 μm polyester film. Instead of one adhesive-coated film, two or three can be used stacked individually and removable for thickness adaptation purposes.

The scope of the invention also includes traditional methods for combining several composites together to obtain a resultant composite of adequate thickness possessing the required chemical/physical characteristics.

The invention claimed is:

1. Self-leveling under-packing for printing presses, comprising:
    at least one polyester-based layer and at least one polyurethane elastomer layer joined inseparably together, said self-leveling under-packing being connected to the printing press,
    wherein in order to achieve the self-leveling of the underpacking, the polyurethane elastomer has the following chemical/physical characteristics:

| Shore hardness A | 75–95 | DIN 53505 |
| Density g/cm$^3$ | 1.10–1.25 | DIN 53479 |
| Cyclic compression % | 60% compressible | DIN 53517 |
| Resilience % | 30–40 | DIN 53512 |
| Solvent resistance | resistant. | |

2. Under-packing as claimed in claim 1, wherein the polyester-based layer is between 50 μm and 350 μm and the polyurethane elastomer layer is between 20 μm and 1000 μm.

3. Under-packing as claimed in claim 1, wherein the polyester-based layer is adhesive-coated on one side, in which case the thickness, including the adhesive, is between 40 and 100 μm, the adhesive thickness not exceeding about 5 μm.

4. Under-packing as claimed in claim 1, wherein several polyester-based layers and several polyurethane elastomer layers are provided, at least some of the layers of the one alternating with layers of the other.

5. Underpacking as claimed in claim 1, wherein there is a plurality of superposed polyester layers, some of said superposed polyester layers being removably joined together by a pressure sensitive adhesive strip along one of their edges.

6. Under-packing as claimed in claim 2, wherein a plurality of the polyurethane elastomer layers are used, at least one of said polyurethane elastomer layers having at least one different said chemical/physical characteristics, from the remaining polyurethane elastomer layers.

7. Under-packing as claimed in claim 1, wherein the removable polyester layers are not more than three in number, with none of them exceeding 50 μm thickness.

8. Under-packing as claimed in claim 2, wherein several polyester-based layers and several polyurethane elastomer layers are provided, at least some of the layers of the one alternating with layers of the other.

9. Under-packing as claimed in claim 2, wherein there is a plurality of superposed polyester layers, some of the superposed polyester layers being removably joined together by a pressure sensitive adhesive strip along one of their edges.

10. Under-packing as claimed in claim 3, wherein there is a plurality of superposed polyester layers, some of the superposed polyester layers being removably joined together by a pressure sensitive adhesive strip along one of their edges.

11. Under-packing as claimed in claim 4, wherein there is a plurality of superposed polyester layers, some of the superposed polyester layers being removably joined together by a pressure sensitive adhesive strip along one of their edges.

12. Under-packing as claimed in claim 9, wherein the removable polyester layers are not more than three in number, with none of them exceeding 50 μm thickness.

13. Under-packing as claimed in claim 10, wherein the removable polyester layers are not more than three in number, with none of them exceeding 50 μm thickness.

14. The under-packing as claimed in claim 6, wherein said at least one different chemical/physical characteristic is shore hardness.

15. A printing press including a plate cylinder; a blanket cylinder with a rubber-coated fabric covering; an impression cylinder and an underpacking below the covering, the improvement to the under-packing comprises a self-leveling under-packing, comprising:

at least one polyester-based layer and at least one polyurethane elastomer layer joined inseparably together, wherein in order to achieve the self-leveling of the underpacking, the polyurethane elastomer has the following chemical/physical characteristics:

| Shore hardness A | 75–95 | DIN 53505 |
|---|---|---|
| Density g/cm$^3$ | 1.10–1.25 | DIN 53479 |
| Cyclic compression % | 60% compressible | DIN 53517 |
| Resilience % | 30–40 | DIN 53512 |
| Solvent resistance | resistant. | |

16. A self-leveling under-packing for printing presses, comprising:

at least one polyester-based layer and at least one polyurethane elastomer layer joined inseparably together and connected to a blanket cylinder of the printing press, wherein in order to achieve the self-leveling of the underpacking, the polyurethane elastomer has the following chemical/physical characteristics:

| Shore hardness A | 75–95 | DIN 53505 |
|---|---|---|
| Density g/cm$^3$ | 1.10–1.25 | DIN 53479 |
| Cyclic compression % | 60% compressible | DIN 53517 |
| Resilience % | 30–40 | DIN 53512 |
| Solvent resistance | resistant. | |

* * * * *